April 20, 1965   W. B. TERRY   3,179,127
CLOSURE HEAD FOR PIPE TESTER
Filed Jan. 30, 1962   3 Sheets-Sheet 3

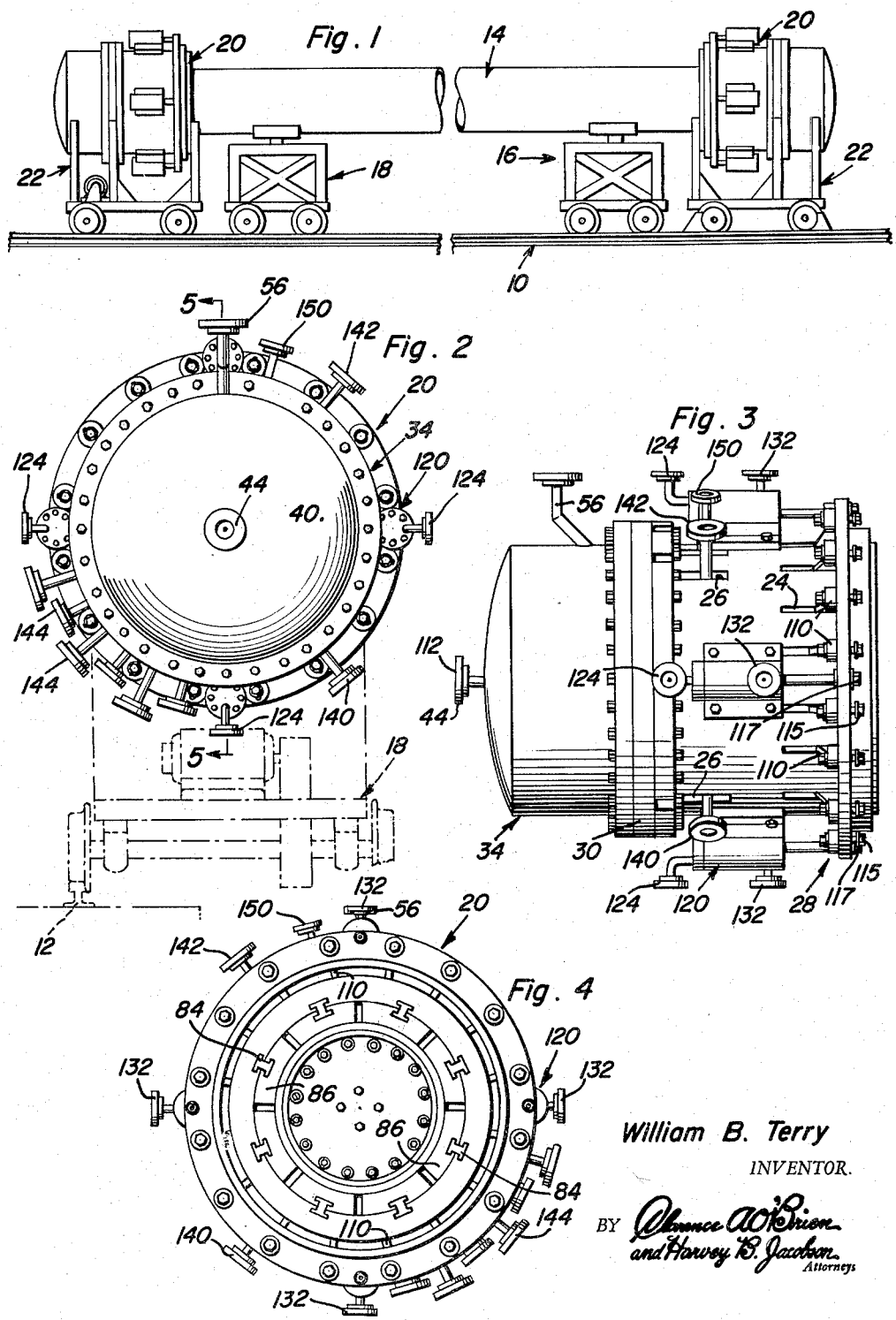

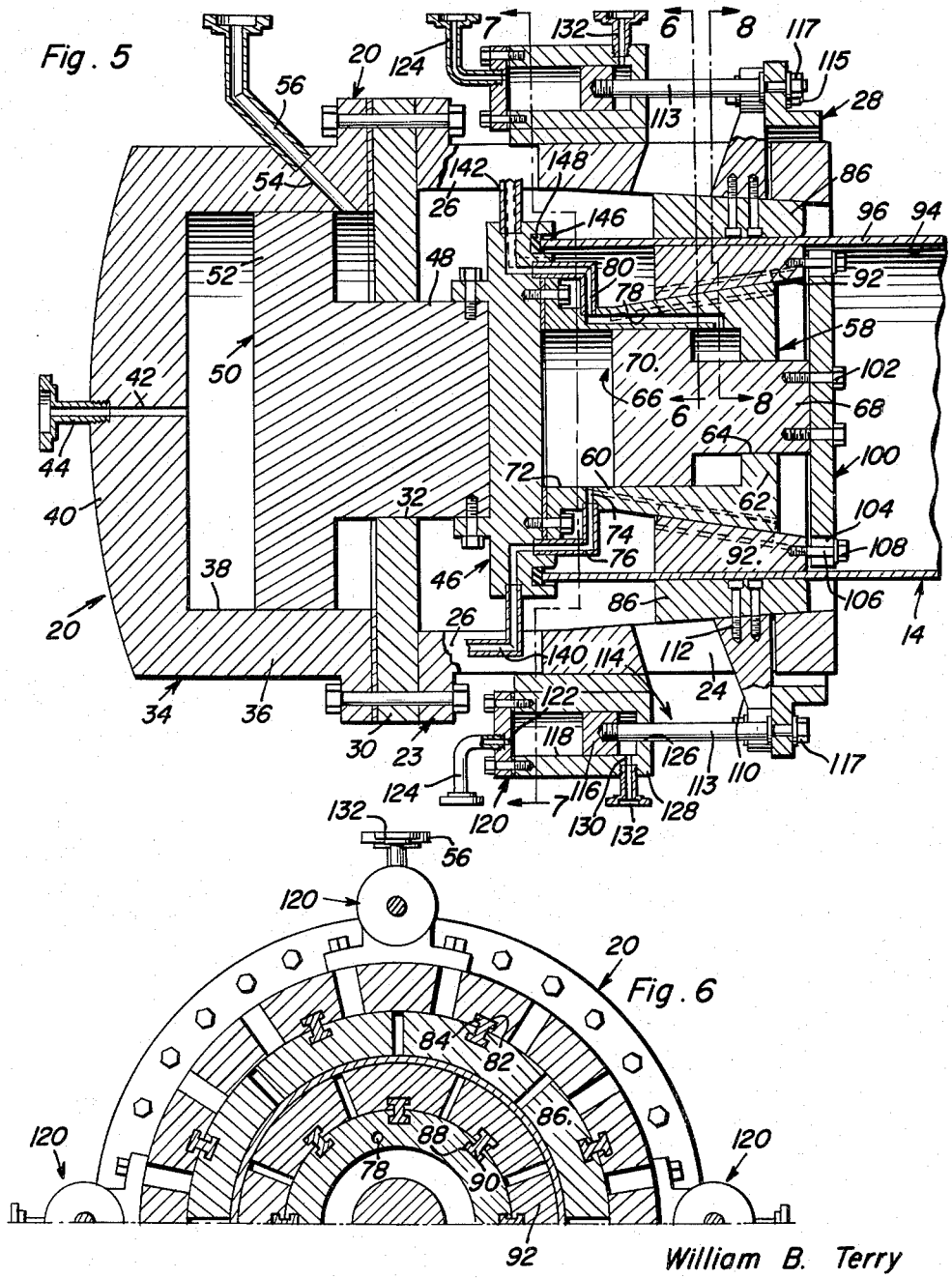

William B. Terry
INVENTOR.

United States Patent Office 3,179,127
Patented Apr. 20, 1965

3,179,127
CLOSURE HEAD FOR PIPE TESTER
William B. Terry, Houston, Tex., assignor of one-half to Nell T. Henson, Houston, Tex.
Filed Jan. 30, 1962, Ser. No. 169,837
11 Claims. (Cl. 138—90)

This invention relates to a novel and useful closure head for sealing one end of a pipe section which is to be pressure tested.

It is to be understood that the closure head of the instant invention is designed to be used in pairs in order that the opposite ends of a single pipe section or string may be sealed in such a manner so that fluid under pressure may be admitted to the interior of the pipe section or string for the purpose of pressure testing the latter.

Additionally, the closure head assembly of the instant invention may also be used merely as a means for frictionally gripping one end of a pipe section for any desired purpose and is constructed in a manner whereby the end of a pipe section may be frictionally gripped thereby with tremendous force and in a manner which will have little tendency to damage the pipe section gripped thereby. Further, the closure head assembly of the instant invention is constructed in a manner whereby it may be utilized to clampingly engage the end of a pipe section from directly opposite internal and external portions thereof. Still further, the head assembly of the instant invention is constructed in a manner whereby the end of a pipe section may be clampingly engaged from the inner and outer surfaces of the pipe section even if the pipe section to be gripped thereby is provided with either a diametrically enlarged or reduced end portion.

While numerous types of head assemblies for sealing one end of a pipe section have been heretofore designed, an efficient head assembly capable of frictionally gripping either the end portion of a pipe section adjacent a diametrically enlarged end portion or a portion of a pipe section adjacent a diametrically reduced end portion has not been devised.

It is therefore the main object of this invention to provide a closure head assembly for closing the end of a pipe section and which may be utilized in pairs to close the opposite ends of a single pipe section in order that the latter may be pressure tested and to provide a closure head assemly which is constructed in a manner that will enable both a diametrically enlarged terminal end portion and a diametrically reduced terminal end portion of a pipe section to be gripped a spaced distance from the terminal end portion thereof in the event such an end portion is not well suited to be clampingly engaged between confronting gripping surfaces.

A further object of this invention, in acordance with the immediately preceding object, is to provide a closure head assembly including fluid inlet means adapted to admit fluid under pressure into a pipe section with which the head assembly is engaged whereby the pipe section may be pressure tested.

A further object of this invention, in accordance with the immediately preceding object, is to provide a closure head assembly including vent means whereby the interior of the pipe section with which the head assembly is engaged may be vented during the process of filling the interior of the pipe section with testing fluid.

Still another object of this invention is to provide a closure head assembly with a wheeled supporting structure adapted for supporting the pressure head assembly from a support element for movement relative to the support element in order that a relatively large pipe section may be stationarily positioned and the closure head assembly of the instant invention may be moved relative to and in engagement with the pipe section to be tested.

A final object to be specifically enumerated herein is to provide a closure head assembly in accordance with the the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing a pipe section supported on a track structure by means of a pair of wheeled support dollies and a pair of the closure head assemblies of the instant invention also movably supported from the track assembly and engaged with the opposite ends of the pipe section;

FIGURE 2 is an outer end elevational view of one of the closure head assemblies with its wheeled supporting structure being shown in phantom lines;

FIGURE 3 is an enlarged side elevational view of one of the closure head assemblies with its wheeled supporting structure removed;

FIGURE 4 is an inner end elevational view of one of the closure head assemblies;

FIGURE 5 is an enlarged longitudinal vertical sectional view taken substantially upon the plane indicated by the section line 5—5 of FIGURE 2;

FIGURE 6 is a fragmentary transverse vertical sectional view taken substantially upon the plane indicated by the section line 6—6 of FIGURE 5;

Figure 7:
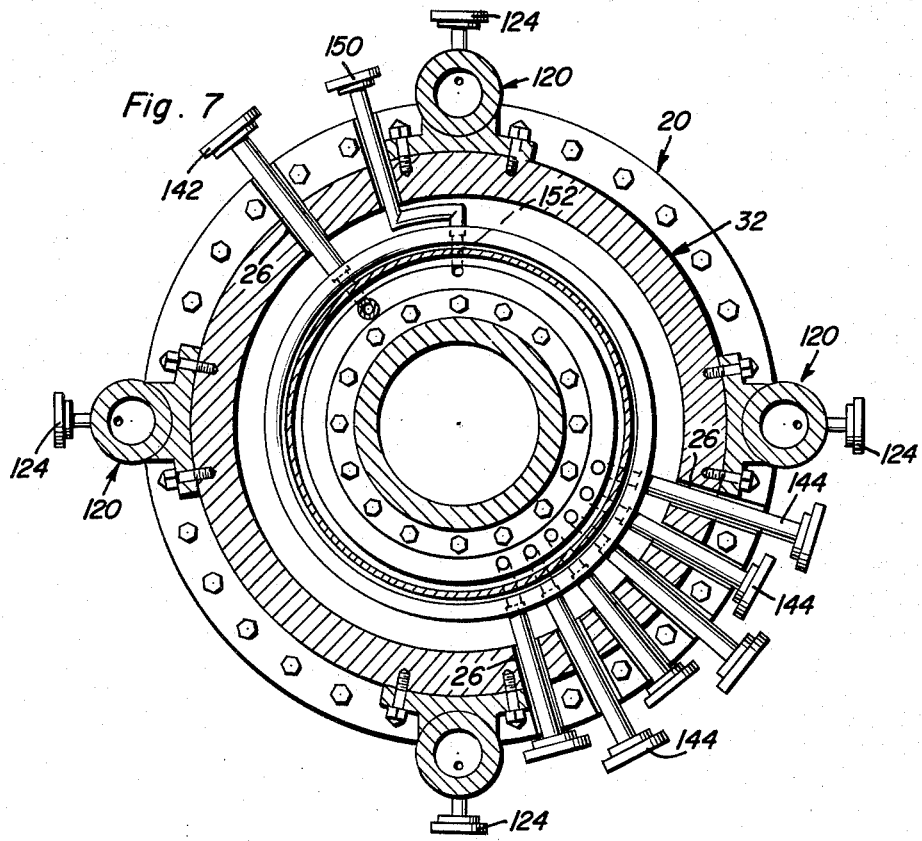
FIGURE 7 is a transverse vertical sectional view taken substantially upon the plane indicated by the section line 7—7 of FIGURE 5.

Referring now more specifically to the drawings the numeral 10 generally designates a track assembly which includes a pair of rails 12. A pipe section generally referred to by the reference numeral 14 has its opposite ends supported by means of wheeled dolly assemblies 16 and 18 and the dolly assemblies 16 and 18 are supported from the rails 12 for movement there along.

Each of the reference numerals 20 generally designates one of the closure head assemblies of the instant invention and it will be noted that each closure head assembly 20 also includes a wheeled dolly assembly generally referred to by the reference numeral 22 mounted on the rails 12 for movement longitudinally there along.

Once the pipe section 14 has been placed on the dolly assemblies 16 and 18, the closure head assemblies 20 are moved into engagement with the opposite ends of the pipe section 14 while the pipe section 14 remains stationary relative to the track assembly 10.

With attention now directed for the most part to FIGURE 5 in particular, it will be seen that each closure head assembly 20 includes a tubular main frame 23 which is provided with two sets of circumferentially spaced and longitudinally extending slots 24 and 26. Mounted concentrically about one end of the tubular main frame 23 is a force ring generally referred to by the reference numeral 28 and secured to the remote end of the tubular main frame 23 is a head plate 30 provided with a centrally disposed bore 32.

An integral head and cylinder assembly generally referred to by the reference numeral 34 is secured to the face of the head plate 30 remote from the main frame 23 and includes a cylindrical portion 36 having a bore 38 formed therein and a head portion 40 including an inlet and outlet passage 42. Any suitable type of fitting 44 may be secured in the outer end of the inlet and outlet passage 42 for a purpose to be more fully hereinafter set forth.

Sealing means generally referred to by the reference numeral 46 is provided and comprises a closure plate or disc which is secured to the shank portion 48 of a piston assembly generally referred to by the reference numeral 50. The shank portion 48 is snugly and slidably received through the bore 32 and the piston assembly includes a diametrically enlarged head portion 52 which is snugly and slidably received in the bore 38. It will be noted that the inlet and outlet passage 42 opens into the outer end of the bore 38 and it may be seen that a second inlet and outlet passage 54 opens inwardly into the inner end of the bore 38. The inlet and outlet passage 54 has a suitable fitting 56 secured in its outer end portion.

The face of the cover plate or disc 46 remote from the shank portion 48 has an integral cylinder and head assembly generally referred to by the reference numeral 58 secured thereto which includes a cylinder portion 60 and a head portion 62 which is provided with a centrally disposed bore 64.

A piston assembly generally referred to by the reference numeral 66 is provided and has a shank portion 68 snugly and slidably received in the bore 64 and a head portion 70 snugly and slidably received in the bore 72 defined by the cylinder portion 60. An inlet and outlet passage 74 opens into the end of the bore 72 adjacent the closure plate or disc 46 and has conduit means 76 operatively associated with its outer end portion which is received through a corresponding one of the slots 26.

An inlet and outlet passage 78 opens inwardly of the end of the bore 72 remote from the closure plate or disc 46 and has conduit means 80 operatively with its outer end which also passes through a corresponding one of the slots 26.

The internal surfaces of the end of the tubular main frame 23 remote from the head plate 30 is provided with a plurality of circumferentially spaced, longitudinally extending and outwardly convergent guideways 82 in which there are secured a plurality of elongated guides 84. The guides 84 are each I-shaped in cross section and project inwardly of the internal surfaces of the main frame 23 and have cam or gripping members 86 slidingly engaged therewith which are arcuate in cross section and are spaced circumferentially about the longitudinal axis of the tubular main frame 23.

Additionally, it will be noted that the outer surfaces of the cylinder and head assembly 58 is also provided with circumferentially spaced, longitudinally extending and outwardly divergent guideways 88 in which elongated guide members 90 are secured which are also I-shaped in cross section. A plurality of inner cam or gripping members 92 are provided and are circumferentially spaced about the cylinder and head assembly 58 and slidingly engaged wtih the guide members 90. The cam or gripping members 92 are also arcuate in cross section and it will be noted upon movement of the guide members 86 and 92 axially of the cylinder and head assembly 58 toward the left side of FIGURE 5 that the outer and inner surfaces of the cam members 92 and 86 will frictionally engage the inner and outer surfaces 94 and 96 respectively of the pipe section generally referred to by the reference numeral 98.

It is to be understood that the inner cam members 92 comprise a portion of inner gripping means for frictionally gripping the inner surfaces 94 of the pipe section 98 and that the outer gripping members 86 form gripping means for gripping the outer surfaces 96 of the pipe section 14.

Each of the gripping members 92 is secured to a force plate generally referred to by the reference numeral 100 which is secured to the end of the shank portion 68 remote from the head portion 70 by means of fasteners 102. The force plate 100 includes a plurality of generally radially extending slots 104 through which the shank portions 106 of the fasteners 108 are slidingly received and it will be noted that the fasteners 108 are utilized to secure the gripping members 92 to the force plate 100. Accordingly, upon movement of the piston assembly 66 within the bore 72, the gripping members 92 may be radially expanded and contracted.

Figure 8:
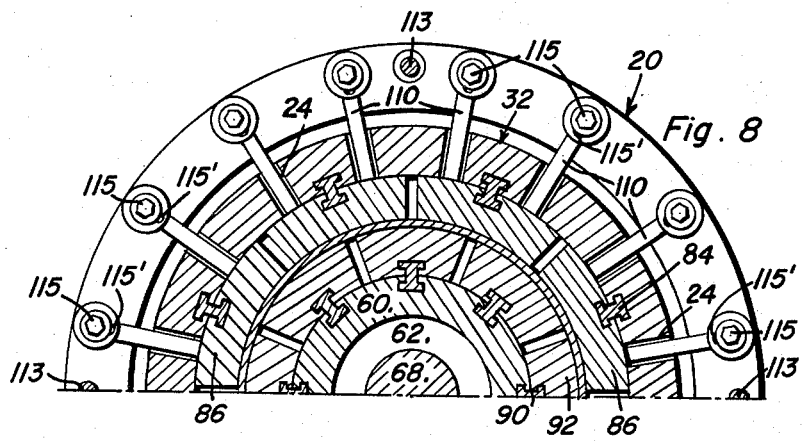
FIGURE 8 is a fragmentary vertical sectional view taken substantially upon the plane indicated by the section line 8—8 of FIGURE 5.

In addition, it will be noted that each of the gripping members 86 is secured to a radially extending arm 110 which is slidingly disposed in the corresponding slot 24. Fasteners 112 are utilized to secure each gripping member 86 to the corresponding arm 110 at the inner end of the latter and it will be noted that the outer end of each arm 110 is secured to the force ring 28 by means of bolts 115 secured through slots 115' formed in the outer ends of arms 110, see FIGURE 8. The piston rod portion 113 of each piston assembly 114 is secured to the force ring 28 by means of fasteners 117 and the head portion 116 is slidingly disposed in the bore 118 of the cylinder of a fluid motor generally referred to by the reference numeral 120 which is provided with a first inlet and outlet passage 122 having a fitting 124 operatively associated therewith. Each shank portion or piston rod 113 is slidingly disposed through a bore 126 formed in the cylinder portion 128 of the corresponding fluid motor 120 and it will be noted that the cylinder portion 128 of each fluid motor 120 also has an inlet and outlet passage 130 which opens inwardly into the end of the corresponding bore 118 remote from the inlet and outlet passage 122. The inlet and outlet passage 130 is also provided with a suitable fitting 132.

Each of the cylinder portions 128 of the fluid motors 120 is secured to the main frame 23 in any convenient manner and it may therefore be observed that the force ring 28 may be reciprocated axially of the main frame 23 by actuation of the fluid motors 120.

It will be noted from FIGURE 5 of the drawings that a fitting 140 is operatively associated with the outer end of the conduit means 76 and that a fitting 142 is operatively associated with the outer end of the conduit means 80. Each of the fittings 140 and 142 is slidingly received through a corresponding one of the slots 26 and it will be noted from FIGURE 7 of the drawings that a plurality of inlet and outlet fittings 144 are provided and open inwardly through the face of the closure plate or disc 46 remote from the shank portion 48 and inwardly of the annular recess 146 formed therein in which an annular seal 148, see FIGURE 5, is disposed for sealing engagement with the free end of the pipe section 98. Each of the fittings 144 is slidingly received through a corresponding one of the slots 26.

With attention now directed to FIGURE 7 of the drawings there will be seen a fitting 150 whose inner end is communicated with a vent passage 152 which opens inwardly through the face of the closure plate or disc 46 remote from the shank portion 48 and inwardly of the annular recess 146.

In operation, it is to be noted that each of the fittings 144, 44, 56, 142, 140, 124 and 132 may be operatively connected to a suitable source of fluid under pressure by means of a flexible conduit. The fittings 144 may be connected to a suitable source of testing fluid under pressure while the remaining fittings other than the fitting 150 may be operatively connected to any suitable source of fluid under pressure. The fitting 150 may merely be provided with any suitable control valve means (not shown) for venting the interior of the pipe section 98 to the ambient atmosphere. It is to be understood that each of fittings 144, 44, 56, 140, 142, 124 and 132 may have suitable control valve means operatively associated therewith whereby fluid may be returned to a suitable reservoir for further use.

In addition, each of the piston head portions 52, 70 and 116 may be provided with suitable sealing ring means for fluid tight sealing engagement with the bores in which they are disposed. Additionally, the bores 32, 64 and 126 may also be provided with sealing ring means for fluid tight sealing engagement with the shank portions 48, 68 and 113 respectively.

In operation, the pipe section 14 may be supported from the dolly assemblies 16 and 18. After the pipe section 14 has been properly positioned, the closure head assemblies 20 may be moved into engagement with the opposite ends thereof. Then, the control valves (not shown) for the fittings 44, 140 and 124 may be moved to the return position. Then the control valves (not shown) servicing the fittings 56, 142 and 132 may be opened whereby the piston assemblies 50, 66 and the piston heads 116 will be moved toward the fitting 44. Then, the closure head assemblies 20 may be moved toward each other to engage the seal means 148 carried by each with the opposite ends of the pipe section 14. Then, the valves servicing the fittings 56, 142 and 132 may be placed in the return position. Thereafter, the valve (not shown) operatively associated with the fitting 150 may be opened in order to vent the interior of the pipe section 14 to the atmosphere and the valve (not shown) operatively associated with the fitting 140 may be opened to admit fluid under pressure into the end of the bore 72 adjacent the closure plate or disc 46 whereby the piston assembly 66 will be moved to the right as viewed in FIGURE 5. Then, the valve operatively associated with the fittings 124 may be opened in order to admit fluid under pressure into the end of the bore 118 remote from the bore 126 to move the piston head portion 116 to the right as viewed in FIGURE 5 of the drawings. This will effect movement of the gripping members 86 and 92 to the right as viewed in FIGURE 5 of the drawings thereby frictionally gripping the corresponding end of the pipe section 14 therebetween. Then, the valve (not shown) servicing the fitting 44 may be opened in order to effect movement of the piston assembly 50 to the right as viewed in FIGURE 5 of the drawings. It will be noted that the effective area of the piston portion 52 is considerably greater than the effective area of the head portion 70 and accordingly, assuming the fluid under pressure within the left ends of the bores 38 and 72 is identical, the cover plate or disc 46 will be urged into tight sealing engagement with the adjacent end of the pipe section 14. Then, the control valves (not shown) servicing the fittings 144 may be opened to admit the testing fluid into the interior of the pipe section 14. After the pipe has been filled, all but one of the control valves servicing the fittings 144 may be closed and the control valve servicing the fitting 150 may be closed. Thereafter, testing pressure may be admitted through the one fitting 144 whose control valve has been left open to make the pressure test. Thereafter, all the valves servicing the fittings 144 may be placed in the return position and the control valve servicing the fitting 150 may be opened.

In order to then release the pipe section 14, the valves servicing the fittings 140 and 124 may be placed in the return position together with the valves servicing the fittings 44. Then, the latter valves may be closed and the valves servicing the fittings 142 and 132 may be opened. Finally, the valves servicing the fittings 144 may be placed in their return position and the valves servicing the fittings 56 may be opened. At this point, pressure within the pipe section 14 will have been vented, the testing fluid therein will have been emptied back into a suitable reservoir and the gripping members 86 and 92 will have been outwardly and inwardly radially contracted respectively, away from engagement with the pipe section 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A closure head assembly having a longitudinal center axis and adapted to seal one end of a pipe to be pressure tested and disposed concentrically about said axis, said assembly comprising a mounting frame, outer inwardly expandible and inner outwardly expandible circumferentially spaced pipe gripping means mounted on said mounting frame concentrically about said axis and adapted to receive and frictionally engage and clamp therebetween one end of a tubular member, seal means mounted from said frame for reciprocal movement relative thereto along said axis and adapted for engagement with said end of said tubular member, and first, second and third motor means operatively connected between said frame and said inner gripping means, said outer gripping means and said seal means respectively for effecting movement thereof toward and away from engagement with said tubular member relative to said main frame.

2. The combination of claim 1 wherein said seal means includes fluid inlet means adapted to admit fluid under pressure into said tubular member from said one end thereof.

3. The combination of claim 1 wherein said mounting frame includes a support wheel assembly adapted for supporting said frame from a support element for movement relative to said support element.

4. The combination of claim 1 wherein said inner and outer gripping means are disposed in a single plane extending transversely of said axis.

5. The combination of claim 1 wherein said inner and outer gripping means include a plurality of outwardly and inwardly movable gripping members respectively having outer and inner surfaces respectively adapted to engage the inner and outer surfaces respectively of said tubular member.

6. The combination of claim 5 wherein the inner and outer surfaces of at least some of said gripping members are disposed relative to each other so as to be adapted to engage directly opposite inner and outer surfaces of said tubular member.

7. The combination of claim 1 wherein said inner and outer gripping means include a plurality of outwardly and inwardly movable gripping members respectively having outer and inner surfaces respectively adapted to engage the inner and outer surfaces respectively of said tubular member, portions of at least some of the gripping members of said outer gripping means circumferentially overlapping adjacent portions of adjacent corresponding ones of the gripping members of said inner gripping means.

8. The combination of claim 1 wherein said seal means includes vent means adapted to vent the interior of said tubular member.

9. The combination of claim 8 wherein said seal means also includes fluid inlet means adapted to admit fluid under pressure into said tubular member from said one end thereof.

10. A closure head assembly having a longitudinal center axis and adapted to seat one end of a pipe to be pressure tested and disposed concentrically about said axis, said assembly comprising a mounting frame, outer inwardly expandible and inner outwardly expandible circumferentially spaced pipe gripping means mounted on said mounting frame concentrically about said axis and adapted to receive and frictionally engage and clamp therebetween one end of a tubular member, seal means mounted from said frame for reciprocal movement relative thereto along said axis and adapted for engagement with said end of said tubular member, first, second and third extensible fluid motor means operatively connected between said frame and said inner gripping means, said outer gripping means and said seal means, respectively, for effecting movement thereof toward and away from engagement with said tubular member relative to said main frame, said motor means each including first and second fluid actuated relatively movable components, one of said components of said first motor means being carried by said seal means and the other of said components of said first motor means being operatively connected to said inner pipe gripping means, one of said components of said second motor means being supported from said frame and the other of said components of said second motor means being connected to said outer pipe gripping means and one of said components of said third motor means being supported from said frame and the other of said components of said third fluid motor means having said seal means supported therefrom.

11. A closure head assembly having a longitudinal center axis and adapted to seal one end of a pipe to be pressure tested and disposed concentrically about said axis, said assembly comprising a mounting frame, outer inwardly expandible and inner outwardly expandible circumferentially spaced pipe gripping means mounted on said mounting frame concentrically about said axis and adapted to receive and frictionally engage and clamp therebetween one end of a tubular member, seal means mounted from said frame for reciprocal movement relative thereto along said axis and adapted for engagement with said end of said tubular member, and first, second and third extensible fluid motor means operatively connected between said frame and said inner gripping means, said outer gripping means and said seal means, respectively, for effecting movement thereof toward and away from engagement with said tubular member relative to said main frame.

References Cited by the Examiner

UNITED STATES PATENTS

| | | | |
|---|---|---|---|
| 942,171 | 12/09 | Ecaubert | 138—89 XR |
| 2,610,651 | 9/52 | Hahn | 138—90 |
| 2,828,620 | 4/58 | Franks | 138—90 |
| 3,030,901 | 4/62 | McConnell | 73—49.1 |

EDWARD V. BENHAM, *Primary Examiner.*